United States Patent

[11] 3,630,707

| [72] | Inventor | Daniel R. Ayers |
| --- | --- | --- |
| | | Shelburne, Vt. |
| [21] | Appl. No. | 832,320 |
| [22] | Filed | June 11, 1969 |
| [45] | Patented | Dec. 28, 1971 |
| [73] | Assignee | Corning Glass Works |
| | | Corning, N.Y. |

[54] TEMPERATURE CONTROL SYSTEM FOR GLASS-SHAPING MOLDS
8 Claims, 3 Drawing Figs.

[52] U.S. Cl. .................................................. 65/162,
65/319
[51] Int. Cl. .................................................. C03b 9/38,
C03b 11/02
[50] Field of Search ........................................... 65/161,
162, 319

[56] References Cited
UNITED STATES PATENTS

| 3,017,159 | 1/1962 | Foster et al. .................. | 416/90 |
| --- | --- | --- | --- |
| 3,045,965 | 7/1962 | Bowmer ........................ | 416/90 |
| 3,171,631 | 3/1965 | Aspinwall ..................... | 416/97 X |
| 3,220,697 | 11/1965 | Smuland et al. ............... | 416/96 |
| 3,301,526 | 1/1967 | Chamberlain .................. | 416/90 X |
| 3,369,792 | 2/1968 | Kraimer et al. ................ | 415/115 |
| 3,370,829 | 2/1968 | Banthin et al. ................ | 415/115 |
| 3,388,888 | 6/1968 | Kercher et al. ................ | 415/115 |
| 3,528,751 | 9/1970 | Quinones et al. .............. | 415/115 |
| 3,071,967 | 1/1963 | Mouly .......................... | 65/162 |
| 3,129,087 | 4/1964 | Hagy ............................ | 65/162 |
| 3,372,017 | 3/1968 | Pitbladdo ...................... | 65/162 |
| 3,407,055 | 10/1968 | Argyle et al. ................. | 65/161 |

FOREIGN PATENTS

| 1,185,541 | 2/1959 | France ......................... | 416/97 |
| --- | --- | --- | --- |
| 985,772 | 3/1965 | Great Britain ................. | 416/96 |

Primary Examiner—Arthur D. Kellogg
Attorneys—Clarence R. Patty, Jr. and Charles W. Gregg ABSTRACT: A system for automatically sensing and controlling the temperature of each of a plurality of molds to within a desired temperature range therefor, each such mold having a cooling fluid control valve associated therewith and each mold being intermittently positioned at a station where each respective valve is adjusted in accordance with an adjustment signal produced by comparing a signal representing the sensed temperature of the respective mold and a set point signal representing the desired temperature for such mold.

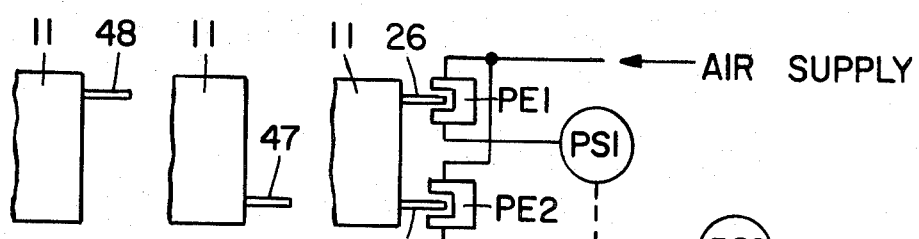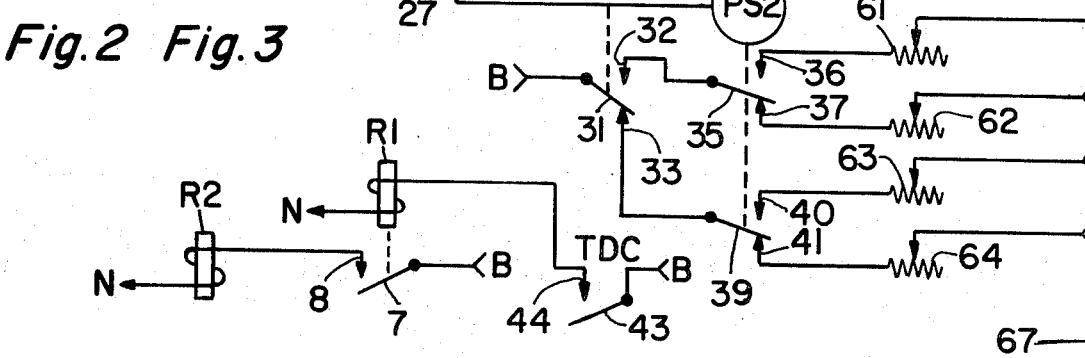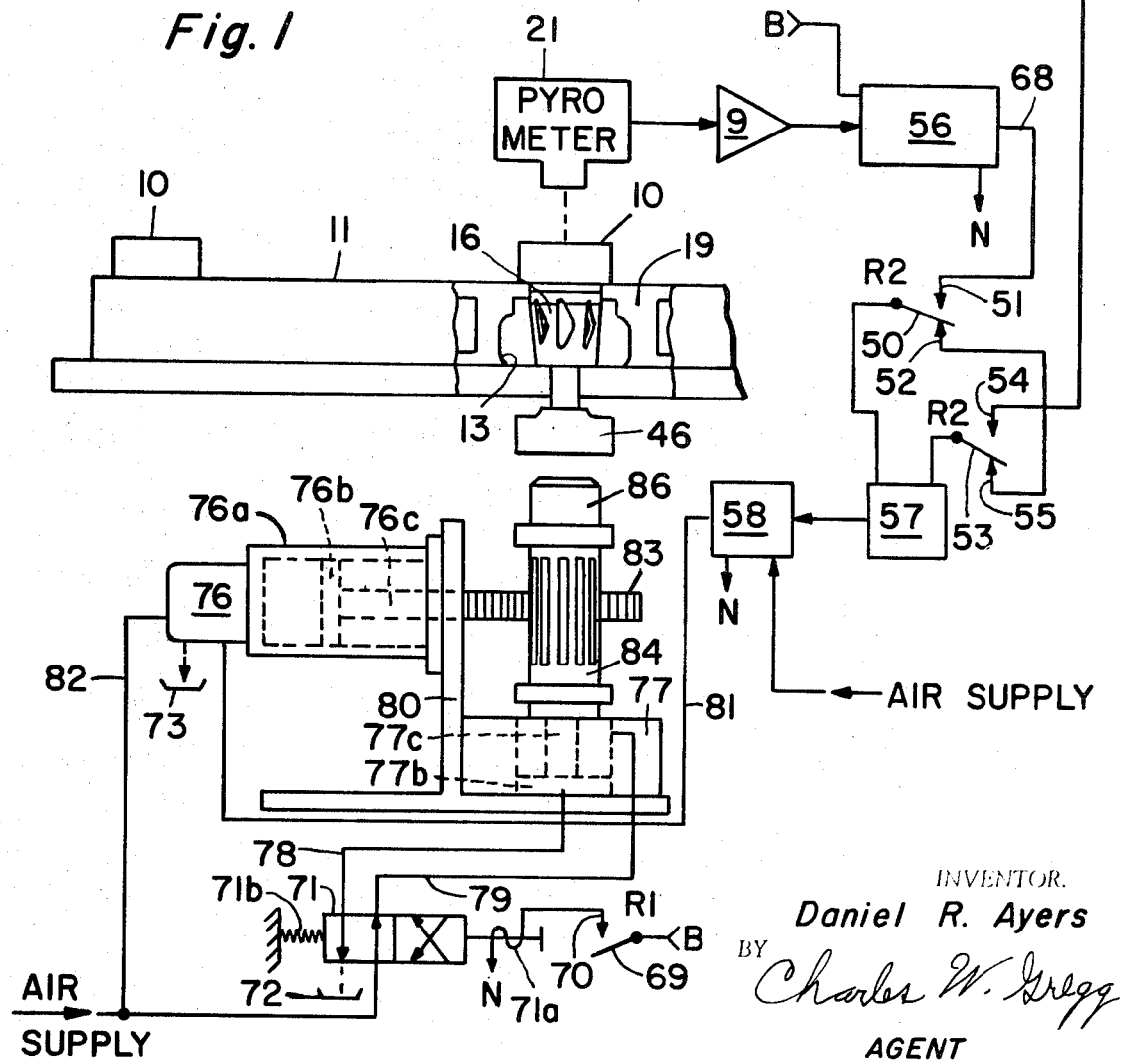

TEMPERATURE CONTROL SYSTEM FOR GLASS-SHAPING MOLDS

BACKGROUND OF THE INVENTION

There is disclosed in U.S. Pat. No. 3,071,967, issued Jan. 8, 1963 to R. J. Mouly, a temperature-measuring system useful in measuring and controlling the temperature of molds in which articles are formed from a heated or molten material. FIG. 12 of such patent illustrates an automatic control system for adjusting the temperature of each of a plurality of molds, such as those mentioned, in accordance with the measured or sensed temperature of a single one of said plurality of molds. The description of the operation of the control system illustrated in said FIG. 12 is covered in lines 17 through 49 of column 17 of said patent.

It has recently been recognized that the temperature of each of a plurality of molds being used to form similar articles from a heated or molten material should not necessarily be the same temperatures as any of the other molds of such plurality in order to produce ware or articles having similar characteristics such as shape and dimensions. Furthermore, each said mold may have cooling characteristics differing from those of the other molds of the plurality thereof and, therefore, require a different amount of cooling fluid to be supplied thereto in order to maintain it within its optimum temperature range for the ware or articles to be formed. It is, thus, apparent that automatically controlling the supply of cooling fluid to all of a plurality of molds in accordance with the sensing of the temperature of a single mold of such plurality, as in the aforecited Mouly patent, does not provide a type of automatic control system that is the most desirable possible.

In view of the above, there was developed an automatic control system for controlling the temperature of each of a plurality of molds in accordance with the article-forming and cooling characteristics of each respective mold and the sensed temperature of each such mold following each forming operation performed thereby. Such system is disclosed in copending patent application Ser. No. 778,280, filed Nov. 22, 1968 by Raymond J. Mouly and Robert L. Thomas, such application being assigned to the same assignee as the present application. In the system of such copending application there is provided apparatus including a memory storing a set point signal representing a predetermined desired temperature for each mold of a plurality of molds used for forming articles or ware from a heated or molten material, a device such as a pyrometer for sensing the temperature of each of said plurality of molds as the respective mold is intermitted positioned at a selected location and for producing signals representative of the sensed temperatures, identification means for producing discrete signals representing or identifying each respective mold and supplying the signals for manipulating the sensed and set point signals for each respective mold and producing adjustment signals representative of any adjustment required in the amount of cooling fluid supplied to the respective mold, and a servosystem responsive to each adjustment signal for adjusting a single valve located at said selected location to vary the supply of cooling fluid to the respective mold associated with the respective adjustment signal. Such single valve is located at said selected location which may be termed a cooling station and the cooling fluid is supplied to each said mold only at such cooling station.

Such a system as disclosed in said copending patent application of Mouly et al. is not satisfactory for all glass-forming operations since it is oftentimes desirable to provide cooling fluid to each of a series of molds during selected parts of or during the entire periods of movement of such molds through a plurality of stations such as mold charging stations, pressing stations, article takeout stations, etc. There is shown, for example, in U.S. Pat. No. 3,138,241 issued June 23, 1964 to Frederick A. Dahlman, a glass-press mold turret or machine in which a plurality of mold holders or adapters are provided adjacent the outer periphery of the table of a turret-type glass-pressing machine with each such holder or adapter supporting a glass-forming mold whose bottom surface is disposed above a hole or opening in the respective mold adapter. Mold-cooling pressurized aeriform fluid is supplied from a suitable fluid manifold, or passages or chambers embodied in a pressing machine of the type mentioned and then flows into a hollow in each said adapter or holder, such fluid then flowing through each such hollow and out through an opening or hole in the top of the respective mold holder or adapter to impinge against the bottom surface of the respective mold supported above such hole or opening for cooling of each such mold. Mold holders or adapters and turret-type glass-pressing machines, such as that mentioned, are well known in the art.

In copending patent application Ser. No. 672,098, filed Oct. 2, 1967 now abandoned by Daniel R. Ayers and Darrell E. Chapin, and assigned to the same assignee as the present application, there is disclosed a pressurized aeriform fluid flow control valve having a first portion of the general configuration of an inverted frustum of a cone with an opening in the base thereof leading to a cavity therein and a second portion of a general configuration of a hollow cylinder extending from the end of said first portion opposite said base, such valve having adjustable fluid flow control slots extending through the sidewall of said first portion and leading to said cavity therein. In use, the valve is disposed with said opening therein adjacent the bottom surface of a glass-pressing or similar mold and the remainder of the valve extends downwardly through a suitable mold holder adapter embodying a hollow through which is supplied, about the outer surface of said first portion of the valve, pressurized fluid for cooling of said mold, the valve being rotatably adjustable to variably control the volume of flow of the cooling fluid from said hollow to said bottom surface of said mold. Valves such as that just described are, as mentioned in said copending application of Daniel R. Ayers et al., readily adaptable for use in a glass-press mold turret such as disclosed in the aforesaid patent to Frederick A. Dahlman.

The object of the present invention is to provide an improved control system over that of the aforecited copending application of Raymond J. Mouly et al., and in which a series of valves, such as disclosed in the cited copending application of Daniel R. Ayers et al., are carried on a mold turret such as shown in the cited Dahlman patent. Said valves may be rapidly rotatively adjusted to vary the supply of cooling fluid to molds carried on said turret, there being one of said valves associated with each such mold.

SUMMARY OF THE INVENTION

In accomplishing the above object of the invention there is provided valve-actuating apparatus which is associated with all of a plurality or series of cooling fluid control valves carried on a turret of a type similar to that heretofore mentioned. Such apparatus is located at a suitable location adjacent the path of rotation of the turret rather than being carried on the turret for controlling the valves mounted thereon. Means are included for identifying each mold indexed to said location and adjusting each respective valve, when necessary, in accordance with a temperature adjustment signal produced in response to or associated with each such identification.

Other objects and characteristic features of the invention will become apparent as the description proceeds.

BRIEF DESCRIPTION OF THE DRAWINGS

The invention will best be understood with reference to the accompanying drawings wherein:

FIG. 1 is a schematic diagram of the sensing and control system embodying the invention and illustrates the identification of one mold of a plurality thereof;

FIG. 2 is a view illustrating a mold identification arrangement for another mold of said plurality thereof; and FIG. 3 is a view similar to FIG. 2 and illustrating the arrangement for identifying a third mold of said plurality of molds.

Similar reference character refer to similar parts in each of the figures of the drawings.

PREFERRED EMBODIMENT OF THE INVENTION

Referring to the drawings in detail, there is shown in FIG. 1 an indexing or intermittently positioned press table 11 which carries a plurality of molds such as 10 which are successively and intermittently moved or indexed through a plurality of stations or positions including a mold-charging station, a forming station, and article takeout station, and a cooling valve adjustment station detailed in such FIG. 1. Table 11 may, for example, be the rotating table of a turret-type glass-forming machine such as shown in the aforesaid Dahlman patent or as in FIG. 12 of the aforesaid patent to Mouly. If a brief reference is made to said FIG. 12 of the Mouly patent, similarity between the apparatus of the present application, including table 11 and molds 10, to that shown in said FIG. 12 will be apparent.

A cooling fluid control valve such as 16 is provided in a mold holder or adapter such as 19 embodying a hollow 13 to which is connected a suitable supply of cooling fluid, such as compressed air for example. Mold holder or adapter 19 is positioned in table 11 below mold 10 and said cooling fluid may, for example, be supplied to hollow 13 in adapter 19 in the manner disclosed in the aforesaid Dahlman patent. Control valve 16 may, for example, be a modification of a valve such as 16 shown in FIG. 2 of the aforesaid patent application of Ayers et al. In the present invention, the amount of cooling fluid which is supplied to mold 10 may be adjusted or varied by rotative actuation of a disklike clutch-contacting member such as 46 provided on the lower end of valve 16. Such actuation of member 46 will be discussed in detail hereinafter in an operational example of the invention. It is expedient to point, however, that each of the molds such as 10 carried by mold table or turret 11 is provided with a mold-cooling arrangement, including a mold adapter such as 19 and a control valve such as 16, similar to that illustrated for mold 10 located at the temperature-sensing or colling valve adjustment station in FIG. 1.

A temperature-sensing device 21 is provided at the temperature-sensing station as shown in FIG. 1 and such device may, for example, be a radiation pyrometer of any standard make. Pyrometer 21 detects the temperature of each mold indexed to or positioned at the temperature-sensing position or station and provides a discrete output signal representative of each such temperature. Each such output signal is supplied as an input to apparatus hereinafter discussed.

As is obvious, press table 11 may carry any practicable number of molds but, for purposes of simplification of the description of the apparatus, it will be assumed that press table 11 carries only four molds such as 10. Such table is, as previously mentioned, intermittently moved or indexed between a series of stations or positions, such positions including a mold-charging position, a press-forming position, an article or ware takeout position, and a temperature-sensing or cooling valve adjustment position where pyrometer 21 is located to sense the temperature of each mold stationed at such position. A discrete binary code is employed to identify each mold positioned at the temperature-sensing position and, since it is assumed for discussion purposes that table 11 carries only four molds such as 10, a two-bit binary code is sufficient to identify each of the four molds, as discussed below.

There is illustrated at the top of FIG. 1 a section of press table 11 having tabs 26 and 27 extending outwardly from the outer periphery of the table adjacent the top and bottom surfaces of the table, respectively. There is also shown a pair of generally U-shaped tab detection devices which are designated PE1 and PE2 and are mounted one above the other near the outer periphery of press table 11. Detection devices PE1 and PE2 are pneumatically controlled devices and each may, for example, be a so-called pneumatic eye such as the Moore Pneumatic Eye, Part No. 9700-Philadelphia, 10, which is manufactured and sold by Moore Products Company, Pa. The input ports of pneumatic eyes PE1 and PE2 are connected to a suitable source of compressed air supply and the output ports of such eyes are connected to the input ports of pressure switches PS1 and PS2, respectively. Pressure switches PS1 and PS2 may each be, for example, a switch such as Model or Part No. 4414–12 also manufactured by the above-named company.

Pneumatic eyes such as PE1 and PE2, and the pressure switches such as PS1 and PS2, are components of a well-known type whose modes of operation are also well known. However, for the purpose of making the description complete it is pointed out that switch PS1 actuates a movable electric circuit controlling contact 31 which is closed against a fixed contact point 32 when the channel or air gap in pneumatic eye PE1 is clear, that is, not occupied by an object such as tab 26. However, when such channel or air gap is occupied as by a tab such as 26, switch PS1 is actuated to close movable contact 31 against fixed contact point 33 as shown in the drawing. Similarly switch PS2 actuates movable electric circuit controlling contacts 35 and 39 which are closed against fixed contact points 36 and 40, respectively, or fixed contact points 37 and 41, respectively, accordingly as the channel or air gap in pneumatic eye PE2 is clear or occupied, respectively. When, therefore, the channel or air gap in pneumatic eye PE2 is occupied, as by a tab such as 27, switch PS2 is actuated to close movable contacts 35 and 39 against fixed contact points 37 and 41, respectively, as shown in the drawings.

There is also shown in FIG. 1 a contact TDC which has a movable contact portion or member 43 and a fixed contact point or member 44. Contact TDC is a contact on the conventional timing drum, such as is usually employed to control the sequence of operations of glass-forming machinery and which is used to control the sequence of movement of table 11 through its different dwell positions. Contact TDC is actuated to close an electrical circuit through its contact members 43 and 44 following the arrival of each mold such as 10 at the temperature-sensing location.

It is expedient to here point out that a source of electrical current of suitable voltage and capacity is provided for energization of the electrical apparatus employed but such source is not shown in the drawings for purposes of simplification thereof. However, the positive and negative terminals of said current source are designated B and N, respectively.

A pair of relays R1 and R2 are provided as shown in FIG. 1, relay R1 being a conventional type relay whose movable contacts are actuated to close electrical circuits immediately subsequent to energization of the control winding of the relay. Relay R2 is a slow acting relay whose movable contacts are actuated to open and close electrical circuits only after predetermined time delays following the energization and deenergization of the control winding of the relay. Such slow acting relays are well known in the art.

Relay R1 has an energizing circuit which extends from terminal B of the previously mentioned current source, over previously mentioned contact members 43 and 44 of timing drum contact TDC and thence through the control winding of relay R1 to terminal N of said current source. Relay R2 has an energizing circuit which extends from said terminal B of the current source over movable contact 7 of relay R1, fixed contact point 8 of such relay, and thence through the control winding of relay R2 to said terminal N of the current source. It is thus apparent that the movable contacts of relay R1 are actuated just subsequent to the actuation of said timing drum contact TDC, while the movable contacts of relay R2, due to the slow-acting feature of such relay, are actuated at a point somewhat later in time following the actuation of said contact TDC.

Each of the previously mentioned four molds such as 10 carried by press table 11 is assigned one of the four discrete binary code identification signals 00, 01, 10 and 11, as also previously mentioned. The mold such as 10 shown stationed or positioned at the temperature sensing or valve adjustment station in FIG. 1 is assigned the binary code 11. At such time, tabs 26 and 27 are, as shown at the top of FIG. 1, occupying the air gaps or channels of pneumatic eyes PE1 and PE2 and, therefore, an electric circuit to an adjustable resistor 64 is prepared.

There is shown in FIGS. 2 and 3, sections of mold table 11 having extending upper and lower tabs 48 and 47, respectively. Such tabs serve to identify second and third ones of the molds 10 which are assigned the binary codes 01 and 10, respectively. When the fourth mold is positioned or stationed at the mold-cooling station, no tabs are located so as to occupy the channels or air gaps of pneumatic eyes PE1 and PE2, and a circuit is prepared to an adjustable resistor 61. Movable contacts 31 and 35 of switches PS1 and PS2 are, of course, closed against fixed contact points 32 and 36 whenever the molds such as 10 are being indexed or moved between the stations mentioned, but electrical energy does not flow through said resistor 61 at such time. This will be further discussed hereinafter.

When press table 11 moves so that the mold 10 identified by binary code 01 is at the cooling station, tab 48 will occupy the air gap of pneumatic eye PE1 and an electric circuit through an adjustable resistor 63 will be prepared. Similarly, when table 11 moves so that the mold 10 identified by binary code 10 (one-zero) is at the cooling station, tab 47 will occupy the air gap of pneumatic eye PE2 and an electric circuit through an adjustable resistor 62 will be prepared. This will be readily apparent to those skilled in the switching circuit art.

The adjustable resistors 61 through 64 mentioned above are employed for providing set point signals representing a desired temperature for each individual mold. Such resistors are manually adjustable and, therefore, the set point signals can be adjusted or varied when found necessary to do so. Each such set point signal from said resistors is individually supplied to a conductor 67 and such signal is later compared with a sensed temperature signal from pyrometer 21 as discussed in detail hereinafter.

The output or sensed signals from pyrometer 21, and representing the sensed temperatures of molds such as 10 positioned at the temperature-sensing position or station, are supplied through a suitable amplifier such as 9 to a conventional electrical recorder 56 of the type which includes a retransmitting slide wire. The slide wire of recorder 56 supplies to a conductor 68 a signal representing the temperature sensed by pyrometer 21 when a mold is present at the temperature-sensing station or position. Such signal is conducted over conductor 68 to a fixed contact point 51 of previously mentioned relay R2 and, when such relay is energized so that movable contact member 50 of such relay is closed against contact point 51, said signal is supplied as an input to a controller 57.

Each preset signal is supplied to previously mentioned conductor 67 from one of said adjustable resistors 61 through 64, and each such signal is further supplied over fixed contact point 54 of relay R2 and movable contact member 53 of such relay, when such contact member is actuated to close against contact point 54, to said controller 57 which compares the associated sensed and preset signals to produce resultant signals representative of any differences between the associated sensed temperature signals and the preset temperature signals. Controllers such as 57 are well known and such controller may, for example, be a series 84OR controller such as may be obtained from Taylor Instruments Company, Rochester, New York 14601.

The output or adjustment signals from controller 57 are supplied as inputs to an electropneumatic transducer 58 which in turn, produces pneumatic output signals proportional to the input or adjustment signals supplied thereto and representative of adjustments or corrections necessary in the valves such as 16 for supplying the correct amount of cooling air or fluid to the molds such as 10. Transducers such as 58 are also well known and such transducer may, for example, be a type 545 transducer such as may be obtained from Fisher Governor Company, Marshalltown, Iowa 50158.

The pneumatic output signals from transducer 58 are supplied, through a suitable conduit or pipe 81, to a valve actuator 76 which may, for example, be a type 480 actuator also obtainable from the above-mentioned Fisher Governor Company and which integrally includes a type 3570 positioner and a fluid cylinder 76a including an associated piston 76b and piston rod 76c. Actuators such as 76 are also well known in the art.

It is expedient to point out at this point in the description that, when relay R2 is not energized, that is, when movable contact members 50 and 53 are closed against their respective fixed contact points 52 and 55 as shown in FIG. 1, the input circuits to controller 57 are short circuited or connected with each other. Under such conditions the signal supplied from controller 57 to transducer 58 is such as to actuate the transducer to supply to actuator 76 a signal having a value that causes the piston 76b of the actuator to occupy a substantially midway position within the bore of cylinder 76a as shown in FIG. 1. The purpose of such arrangement will be further discussed hereinafter in an operational example of the invention.

It is also pointed out that when, as previously mentioned, table 11, and therefore molds 10, are being indexed between the various positions of such table and molds, movable contacts 31 and 35 of switches PS1 and PS2 are closed but no electric current flows through resistor 61 at such time because the circuit from conductor 67 to controller 57 is open at contact point 54 of relay R2.

There is also shown in FIG. 1, a pressurized fluid cylinder 77 of a conventional type including a piston 77b and a piston rod 77c. A solenoid actuated pressurized fluid flow control valve 71 is also shown and the solenoid winding 71a of valve 71 is provided with an energizing circuit which extends from terminal B of the current source, over a movable contact member 69 and a fixed contact point 70 of relay R1 in its energized condition, and thence through said winding 71a to terminal N of the current source. Valve 71 is normally in a position in which it supplies pressurized fluid such as compressed air over conduit 79 to one end of cylinder 77 to cause the piston 77b and the piston rod 77c of such cylinder to be retracted therewithin. At such time the other end of such cylinder is connected over a conduit 78 to valve 71, and through such valve to atmosphere or a suitable fluid sink 72. When solenoid winding 71a is energized, valve 71 is actuated to reverse the connections to conduits 78 and 79 and, thence to cylinder 77, to actuate piston 77b and piston rod 77c of such cylinder to their extended positions. Upon subsequent deenergization of winding 71a, coil spring 71b of valve 71 reactuates valve to its normal position shown in FIG. 1 of the drawings. Valves such as 71 are well known and the purpose of such valve and of cylinder 77 will be readily understood in connection with the operational example of the invention hereinafter set forth.

The otherwise free end of piston rod 76c of cylinder 76a has attached thereto a rack gear 83 whose teeth mesh with cooperative teeth provided about the outer periphery of a spline gear 84. Spline 84 is rotatably mounted on the otherwise free end of piston rod 77c of cylinder 77 and there is affixed to the upper end of spline 84 z clutch 86 which may, for example, be a friction or a magnetic clutch of any type suitable for engaging, in a rotational driving relationship therewith, the previously mentioned disklike member 46 affixed to the lower end of valve 16. It is thus apparent that clutch 86 is actuated in an upper direction to engage member 46 whenever piston 77b and piston rod 77c of cylinder 77 are actuated upwardly by supplying pressurized fluid, such as compressed air, over conduit 78 to the lower end of cylinder 77. Such operation will also be further discussed hereinafter in the operational example which follows.

It will first be assumed that a mold such as 10 and having the binary code identification 11 is indexed to the temperature-sensing position or station below pyrometer 21 as illustrated in FIG. 1 and that the valve 16 associated with such mold is fully open at such time because maximum cooling fluid was previously being supplied to mold 10. The apparatus including spline 84 and its associated clutch 86, cylinder 77 and its associated piston 77b and piston rod 77c, and cylinder 76a and its associated piston 76b and piston rod 76c are, at such time, in their normal positions shown in FIG. 1.

Under the above assumed conditions, when the mold such as 10 (binary code 11) arrives at the sensing station, an electrical circuit through contacts 31-33 of switch PS1 and 39-41 of switch PS2, and further extending through adjustable resistor 64 to conductor 67 and thence to controller 57, is prepared. Upon the subsequent actuation of contact member 53 of relay R2 against fixed contact point 54 of such relay, a preset signal is supplied from resistor 64 as an input to controller 57. Pyrometer 21 senses the temperature of the mold 10 then at the temperature-sensing station and supplies through amplifier 9 to recorder 56 a signal representative of the sensed temperature of mold 10. The slide wire of recorder 56, in turn, supplies to conductor 68 a signal also representative of said sensed temperature. The signal supplied from the slide wire of recorder 56 to conductor 68 is supplied to fixed contact point 51 of relay R2 and, when movable contact member 50 of such relay is actuated to a closed condition against contact point 51, a second input is supplied to controller 57.

Prior to the actuation of movable contact members 50 and 53 of relay R2 discussed above, relay R1 is actuated to close movable contact member 69 of such relay against fixed contact point 70 of the relay. Solenoid winding 71a of valve 71 is thereby energized and such valve is actuated to supply pressurized fluid over conduit 78 to the lower end of the cylinder 77. Conduit 79 is connected to atmosphere or to fluid sink 72 at such time. The pressurized fluid supplied to the lower end of cylinder 77 actuates piston 77b and, thereby, piston rod 77c upwardly. Such actuation also moves spline 84 upwardly and causes clutch 86 to engage the bottom of member 46 affixed to the lower end of valve 16.

The sensed and preset temperature signals, supplied as inputs to controller 57 as discussed above, are compared and such controller produces a resultant output signal which is representative of any difference in the desired temperature for mold 10 (the preset signal) and the sensed temperature for such mold. Such resultant output signal is supplied to transducer 58 which produces a pneumatic output signal proportionate to the electrical input signal supplied thereto and representative of a correction needed in the adjustment of valve 16 to bring mold 10 to the desired temperature. For purposes of the present example it will be assumed that mold 10 is too cold, that is, that the pneumatic signal from transducer 58 indicates that valve 16 must be at least partially closed so that less cooling air is supplied to mold 10. Under such assumed conditions, the pneumatic signal supplied to actuator 76 over conductor 81 and from transducer 58 causes piston 76b and, thereby, piston rod 76c of actuator 76, to move rack 83 to rotate spline 84 and cause clutch 86 to rotate member 46 a distance representative of the value of the pneumatic correction signal supplied to actuator 76. Such rotation of clutch 86 and, thereby, member 46 actuates valve 16 to close a predetermined amount to reduce the cooling fluid supplied to mold 10 during the next complete rotation of table 11.

Shortly prior to the end of the period of dwell for mold 10 at the temperature-sensing station, contact TDC of the timing drum opens, thereby deenergizing relay R1 which, in turn, deenergizes slow acting relay R2. Just prior to the end of said dwell period, relay R2 releases to actuate its movable contact members 50 and 53 from engagement with fixed contact points 51 and 54, respectively, and into engagement with fixed contact points 52 and 55, respectively. The above-mentioned deenergization of relay R1 actuates movable contact 69 member of such relay from engagement with fixed contact point 70 of the relay and the energizing circuit for solenoid winding 71a of valve 71 is opened. Spring 71b actuates valve 71 to its normal position shown in FIG. 1 and conduits 79 and 78 are, thereby, connected to the air supply, and to atmosphere or sink 72, respectively. The supply of compressed air or other pressurized fluid to conduit 79 reactuates piston 77b and piston rod 77c downwardly in cylinder 77, and clutch 86 is, thereby, moved from its engagement with the bottom of member 46 on the lower end of valve 16.

Subsequent to the above-described actuations or movement of clutch 86 from engagement with member 46, said movable contact members 50 and 53 of relay R2 close against fixed contact points 52 and 55, respectively, of such relay, and the input terminals of controller 57 are again short circuited as shown in FIG. 1. Such short circuit, as previously mentioned, causes a signal to be supplied to transducer 58 which actuates such transducer to supply a pneumatic signal to actuator 76 which causes piston 76b in cylinder 76a to return to its generally midway position within the bore of cylinder 76a. The apparatus is now back to its normal condition.

It will now be assumed that on the next positioning of the mold 10 (binary identification code 11) to the temperature-sensing position, pyrometer 21 detects that such mold is at a temperature in excess of the desired temperature therefor as represented by the setting of adjustable resistor 64. Under such conditions the pneumatic signal then supplied by transducer 58 to actuator 76 is of a value representative of an adjustment necessary in valve 16 to open such valve a preselected amount to lower the temperature of mold 10 to or towards the desired temperature therefore as represented by the preset signal supplied from resistor 64.

In view of the above discussion, it will be apparent to those skilled in the art that, when the sensed signal for mold 10 from pyrometer 21 agrees with the present signal from resistor 64 for such mold, the electrical adjustment signal supplied to transducer 58, and the pneumatic signal then supplied from such transducer to actuator 76, is of the same value as the signal supplied to such actuator when the input terminals of controller 56 are short circuited as previously discussed. Under such conditions, therefore, na adjustment of valve 16 occurs and mold 10 will receive the same amount of cooling fluid or air during the next revolution of table 11 as it did during the previous revolution.

In the light of the above discussion it will be apparent that each mold such as 10 indexed to the temperature-sensing or valve adjustment station will be identified by a discrete binary code which will cause a temperature preset signal, representing the desired temperature for the respective mold, to be compared with the actual temperature of such mold sensed at said station, to thereby produce a resultant adjustment or correction signal representative of adjustment necessary in the amount of cooling air to be supplied to the respective mold to bring it to the desired temperature therefor as represented by said preset signal. Each respective adjustment signal so produced is supplied to the control apparatus located at said temperature-sensing or valve adjustment station to actuate such control apparatus to adjust the respective cooling air control valve associated with each respective mold for which each respective adjustment signal is produced, such adjustment of each said valve regulating the cooling air supplied to the respective mold during the next revolution of table 11 so that such mold, on its next arrival at said temperature-sensing station, will have been substantially cooled to or towards the desired temperature therefor as represented by said preset signal for the mold.

I claim:

1. In a glass-forming apparatus in which each of a plurality of molds carried on a rotatable table or turret are successively and intermittently positioned by said turret at each of a plurality of stations including a mold temperature-sensing station located along the path of rotation of the turret, a mold temperature control system comprising;
    A. an adjustable valve associated with each said mold for controlling an amount of cooling air supplied to the respectively associated mold,
    B. means for providing a preset signal representative of the desired temperature for each said mold,
    C. means at said temperature-sensing station for providing a signal representing the actual temperature of each said mold positioned at such station,
    D. means for identifying each said mold positioned at said temperature-sensing station and selecting said preset signal for the respectively identified mold, E. means receiving said preset and sensed signals for each said mold and comparing such signals to produce a resultant signal representative of adjustment necessary in said valve associated with the respective mold to bring the temperature of such mold into agreement with the desired temperature for that mold, and F. means receiving each said adjustment signal and responsive thereto for adjusting said valve associated with the respective mold for which each respective adjustment signal is produced.

2. A control system in accordance with claim 1 and in which said sensed and preset signals are electrical signals and said adjustment signal is a pneumatic signal.

3. A control system in accordance with claim 1 and in which said mold identification means employs a discrete binary code associated with each said mold.

4. A control system in accordance with claim 2 and in which said mold identification means employs a discrete binary code associated with each said mold.

5. In combination with a machine for forming articles from heated or molten material and which intermittently positions each of a plurality of article forming molds at a plurality of stations including material-charging, article-forming, article-takeout and mold temperature-sensing stations, a mold temperature control system comprising;

A. individual adjustable means associated with each said mold for supplying cooling fluid to the respectively associated mold, B. means for sensing the temperature of each said mold positioned at said temperature station and producing signals representative of each respective mold temperature, C. means for producing identification signals for each respective mold arriving at said temperature-sensing station, D. means responsive to said identification signals for producing preset signals representative of a desired temperature for each respective mold, E. means receiving and responsive to the sensed and preset signals for each respective mold positioned at said temperature-sensing station to produce an adjustment signal representative of any adjustment required in said associated cooling fluid supply means for cooling the respective mold to its desired temperature prior to its next arrival at said sensing station, and F. means responsive to each said adjustment signal for adjusting the respectively associated cooling fluid supply means in accordance with the value of the respective adjustment signal.

6. A control system in accordance with claim 5 and in which said sensed and preset signals are electrical signals and said adjustment signal is a pneumatic signal.

7. A control system in accordance with claim 5 and in which said mold identification means employs a discrete binary code associated with each said mold.

8. A control system in accordance with claim 6 and in which said mold identification means employs a discrete binary code associated with each said mold.

* * * * *